United States Patent [19]
Freyermuth et al.

[11] 3,903,110
[45] Sept. 2, 1975

[54] N-(2-PYRROLIDINONYL) METHYL CARBAMATE DERIVATIVES

[75] Inventors: Harlan Benjamin Freyermuth; David I. Randall, both of Easton, Pa.

[73] Assignee: GAF Corporation, New York, N.Y.

[22] Filed: Apr. 27, 1972

[21] Appl. No.: 248,021

[52] U.S. Cl. ...... 260/326.25; 260/326.43; 260/999; 71/95
[51] Int. Cl. ............................................. C07d 27/08
[58] Field of Search........ 260/326.3, 326.43, 326.25

[56] References Cited
UNITED STATES PATENTS

| | | | |
|---|---|---|---|
| 2,700,039 | 1/1955 | Ehrhart et al. | 260/239.1 |
| 2,945,863 | 7/1960 | Buc et al. | 260/326.3 |
| 3,001,955 | 9/1961 | Taub | 260/2.5 |
| 3,073,834 | 1/1963 | Bortnick | 260/294 |
| 3,287,471 | 11/1966 | Cusic | 260/326.3 |
| 3,370,079 | 2/1968 | Horlein | 260/326.3 |
| 3,449,360 | 1/1969 | Mizzoni | 260/313.1 |

FOREIGN PATENTS OR APPLICATIONS

| | | | |
|---|---|---|---|
| 576,465 | 5/1959 | Canada | 260/326.3 |

OTHER PUBLICATIONS

Wagner et al., Synthetic Organic Chemistry, Wiley and Sons, 1953, New York, p. 645.

*Primary Examiner*—Joseph A. Narcavage
*Attorney, Agent, or Firm*—Walter C. Kehm; James N. Blauvelt

[57] ABSTRACT

Compounds having the formula

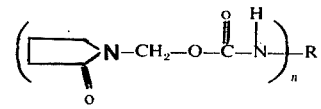

wherein $n$ is 1 or 2 and R is a monovalent or divalent aliphatic, alicyclic or aryl radical produced by the reaction of n moles of an isocyanate or diisocynate with n moles of N-hydroxymethyl-2-pyrrolidinone and uses thereof.

13 Claims, No Drawings

N-(2-PYRROLIDINONYL) METHYL CARBAMATE DERIVATIVES

BACKGROUND OF THE INVENTION

This invention relates to novel derivatives of N-(2-pyrrolidinonyl carbamate, a method of making same and uses thereof.

Among the various materials known in the art as being plant growth regulators, the derivatives of phosphonic acid are currently enjoying prominence. It has now, however, been found that a group of derivatives of N-hydroxymethyl pyrrolidinone, specifically certain monovalent or divalent aliphatic, alicyclic or aryl radical substituted derivatives thereof, have unique biological activity in that they exhibit plant growth regulation by effectively inhibiting the flowering of plants. The aforesaid derivatives are also useful as pharmaceutical agents and an intermediates for dyestuffs.

The reaction product of phenyldiisocyanate and 2-pyrrolidinone as well as the products obtained from reaction of m-phenylenediisocyanate and hexamethylene diisocyanate and 2-pyrrolidinone are known in the art. The preparation N-hydroxymethyl-2-pyrrolidinone is also known. It has not, however, been reported in the art that the reaction of an isocyanate with an N-hydroxymethyl-2-pyrrolidinone and that the derivatives will be useful as described above.

SUMMARY OF THE INVENTION

It is accordingly an object of this invention to provide derivatives of N-hydroxymethyl-2-pyrrolidinone.

It is another object of this invention to provide for such derivatives, methods of preparation thereof and uses therefor, such as the application to plants as plant growth regulators.

It is still another object of this invention to provide for such derivatives for use as pharmaceutical agents and as intermediates in the synthesis of dyestuffs for synthetic fibers.

It is still another object of the instant invention to obviate one or more drawbacks of the prior art.

Other objects and advantages of the present invention will become apparent as the description thereof proceeds hereinafter.

In satisfaction of the foregoing objects and advantages, there is provided by this invention, derivatives of N-hydroxymethyl-2-pyrrolidinone of the following formula:

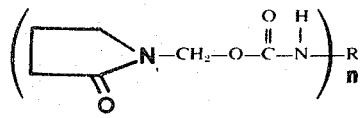

wherein R is a substituted and unsubstituted phenyl, said substituted phenyl being substituted by nitro or one or two chloro atoms; substituted and unsubstituted $C_1$–$C_6$ alkyl, said substituted alkyl being mono-substituted by chloro; and naphthyl and $n$ is 1 or 2. These compounds are synthesized by the reaction of $n$ or $n/2$ moles of an isocyanate and $n$ moles of N-hydroxymethyl-2-pyrrolidinone.

It is known that it is characteristic of most carbamate derivatives to generate gas and evolve carbon dioxide at their melting points. For this reason, they are useful as blowing agents where it is of interest to generate an inert gas at an elevated temperature. Thermal decomposition by VPC yields fractions which are analyzed by IR and which indicate that besides carbon dioxide, several organic products are obtained. Decomposition with the evolution of carbon dioxide normally leaves a colorless liquid, the composition of which has not been completely determined.

The carbamate derivatives herein described are conveniently prepared by the reaction of an isocyanate or diisocyanate with N-hydroxymethyl-2-pyrrolidinone.

In carrying out the reaction, any isocyanate may be used, the only requirement being that it does not have reactive substituents such as hydroxy or amino groups. The choice of isocyanate will determine the derivative produced; preferred are substituted and unsubstituted phenyl isocyanates, diisocyanates and substituted and unsubstituted aliphatic isocyanates. Exemplary are p-bromophenyl isocyanate, butyl isocyanate, tert.-butyl isocyanate, 2-chloroethyl isocyanate, o-chlorophenyl isocyanate, m-chlorophenyl isocyanate, p-chlorophenyl isocyanate, 2,5-dimethylphenyl isocyanate, dodecyl isocyanate, ethyl isocyanate, hexamethylene diisocyanate, hexyl isocyanate, methylene-di-p-phenyl, diisocyanate, methyl isocyanate, 1-naphthyl isocyanate, o-nitrophenyl isocyanate, m-nitrophenyl isocyanate, p-nitrophenyl isocyanate, octyl isocyanate, p-phenylazophenyl isocyanate, phenyl isocyanate, p-toluenesulfonyl isocyanate, tolylene-2,4-diisocyanate, o-toly isocyanate, m-tolyl isocyanate, p-tolyl isocyanate, trichloroacetyl isocyanate.

The aforementioned compounds include those in which the monovalent or divalent aliphatic, alicyclic or aryl radicals may be mono- or di-substituted.

As examples of the foregoing there may be mentioned the $C_{1-18}$ alkyl, aryl or alicyclic radicals wherein there is mono-, di- or tri-substitution thereon, i.e., halo, or nitro substituents. For example, fluorine, chlorine, bromine, and iodine, chlorine being preferred. For example, bicyclohexyl, butylcyclohexane, cyclododecane, 1,5,9-cyclododecatriene, cyclododecene, cyclohexane, cyclohexene, 1,5-cyclooctadiene, cyclooctane, cyclooctene, decahydronaphthalene, decane, di-isobutylene, 1,3-dimethyladamantane, 2,5-dimethyl-2,4-hexadiene, diphenylacetylene, 1,6-diphenyl-1,3,5-hexatriene, dodecane, dotriacontane, eicosane, 3-ethyl-2-pentene, heptane, hexacosane, hexadecane, hexane, hexatriacontane, isoprene, ligroin, (+)-limonen, 2-methylbutane, 2-methyl-2-butene, methylcyclohexane, 4-methylcyclohexene, nonane, octacosane, 1-octadecene, 1,7-octadiene, octane, octene-(1 and 2), pentane, pentene, 2-phellandrene, 1-phenylheptane, 1-phenylnonane, 1-phenylpentadecane, 1-phenyltetradecane, 1-phenyltridecane, 1-phenylundecane, pinene, squalane, tetra-iso-butylene, tetracosane, tetradecane, 2,6,10,14-tetramethyl-pentadecane, tetraphenylethylene, triiso-butylene, tricosane, 1,5,9-trimethylcyclododecatriene, 2,2,4-trimethylpentane, undecane, benzene, benzylbiphenyl, bibenzyl, biphenyl, butylbenzene, iso-butylbenzene, sec.-butylbenzene, tert.-butylbenzene, p-tert.-butyltoluene, cumene, p-cymene, p-di-tert.-butylbenzene, p-dicyclohexylbenzene, diethylbenzene, 1,4-diphenyl-1,3-butadiene, 1,1-diphenylethylene, diphenylmethane, di-isopropylbenzene, ethylbenzene, hexaethylbenzene, hexamethylbenzene, hexaphenylbenzene, indene, mesitylene, a-methylstyrene, 1,2,3,4,5,6,7,8-octahydroanthracene, pentamethylbenzene, pentylbenzene, tert.-pentylbenzene, phenylacetylene, phenylcyclohexane, 1-phenyldecane, 1-phenyldodecane, 3-phenyldodecane, 1-phenylhexane, 1-phenyloctane, propylbenzene, p-quaterphenyl, trans-stilbene, styrene, o-terphenyl, m- ter-phenyl, p-terphenyl, 1,2,3,4-tetrahydronaphthalene, 1,1,4,4-trimethylbenzene, 1,1,2-triphenylethane, triphenylethylene, triphenylmethane, o-oxylene, m-xylene, p-xylene, xylene, acenaphthene, anthracene, benz (a) anthracene, 1,1'-binaphthyl, camphene, chrysene, cecahydronaphthalene, dibenz-(a.h)anthracene, dicyclopentadiene, 7,12-dimethylbenz(a)anthracene, dimethylnaphthalene, 9-methylanthracene, 3-methylcholanthrene, 1-methylnaphthalene, 2-methylnaphthalene, naphthacene, naphthalene, 2,5-norbornadiene, phenanthrene, pyrene, tetradecahydrophenanthrene, 5,6,11,12-tetraphenylnaphthacene, triplycene.

As an example of the halogen substituted radicals, there may be mentioned: 9,10-bis(chloromethyl)anthracene, 1,-4 bis (chloromethyl)cyclohexane, 1-bromobutane, 2-bromobutane, 1-bromo-2-chloroethane, bromochloromethane, 1-bromo-e-chloropropane, 2-bromo-1-chloropropane, bromocyclohexane, bromocyclopentane, 1-bromodecane, 1-bromododecane, 1-bromoeicosane, bromoethane, bromoform, 1-bromohepatadecane, 1-bromohepatane, 1-bromohexadecane, 1-bromohexane, bromomethane, 1-bromo-3-methylbutane, 3-(Bromomethyl)heptane, 2-bromo-4-methylpentane, 3-(bromomethyl)pentane, 1-bromo-2-methylpropane, 2-bromo-2-methylpropane, 1-bromononadecane, 1-bromononane, 1-bromooctadecane, 1-bromooctane, 2-bromooctane, 1-bromopentadecane, 1-bromopentane, 1-bromopropane, 2-bromopropane, 3-bromopropene, 1-bromotetradecane, bromotrichloromethane, 1-bromotridecane, 1-bromoundecane, a-bromo-m-xylene, carbon tetrabromide, carbon tetrachloride, 1-chlorobutane, chlorocyclohexane, 1-chlorodecane, 1-chlorododecane, 1-chloroeicos, chloroethane, (1-chloroethyl)benzene, chloroform, 1-chlorophetane, 1-chlorohexadecane, 1-chlorohexane, 1-chloro-3-methybutane, 2-chloro-2-methylbutane, 1-chloro-3-methyl-2-butane, 4-chloromethyl-1,2-dimethylbenzene, 3-(chloromethyl)heptane, 2-chloro-4-methylpentane, 3-(chloromethyl)pentane, 1-chloro-2-methylpropane, 2-chloro-2 -methylpropane, 1-chlorononane, 1-chlorooctadecane, 1-chlorooctane, 1-chloropentane, 1-chloropropane, 2-chloropropane, 3-chloropropene, 1-chlorotetradecane, a-chlorotoluene, 1-chlorotridecane, 1-chloroundecane, a-chloro-o-xylene, 1,2-dibromobutane, 1,3-dibromobutane, 1,4-dibromobutane, 2,3-dibromobutane, trans-1,4-dibromo-2-butene, 1,10-dibromodecane, 1,2-dibromo-1,1-dichloroethane, 1,1-dibromoethane, 1,2-dibromoethane, 1,2-dibromohexane, 1,6-dibromohexane, dibromomethane, 1,2-dibromo-2-methylpropane, 1,5-dibromopentane, 1,2-dibromopropane, 1,3-dibromopropane, 2,3-dibromopropene, 1,14-dibromotetradecane, 1,1-dichlorobutane, trans-1,4-dichloro-2-butene, 1,10-dichlorodecane, 1,1-dichloroethane, 1,2-dichloroethane, 1,2-dichloroethane, cis-1,2-dichloroethylene, trans-1,2-dichloroethylene, 1,2-dichloroethylene, 1,6-dichlorohexane, dichloromethane, 1,5-dichloropentane, 1,2-dichloropropane, 1,3-dichloropropane, 2,3-dichloropropene, o,m-dichlorotoluene, o,p-dichlorotoluene, diiodomethane, 1,5-diiodopentane, 1,3-diiodopropane, 1fluorodecane, 1,fluorohexane, 1,1,1,2,3,3,3-heptachloropropane, 1,-2,3,4,5,6-hexabromocyclohexane, hexachloro-1,3-butadtene, 1,2,3,4,5,6-hexachlorocyclohexane,(2-isomer) hexachloroethane, a,a,a,a',a',a'-hexachloro-p-xylene, 1-iodobutane,2-iodobutane, iodocyclohexane, 10iododecane,1-iodododecane, iodoethane, iodoform, 1-iodoheptane, 1-iodohexadecane, 1-iodohexane, iodomethane, 1-iodo-3-methylbutane, 1-iodo-2-methylpropane, 2-iodo-2-methylpropane, 1-iodooctadecane, 1-iodooctane, 2-iodooctane, 1-iodopentane, 1-iodopropane, 2-iodopropane, 3-iodopropene, methallyl chloride, a,a,a,2,4-pentachlorotoluene, 1,2,3,4-tetrabromobutane, 1,1,2,2-tetrabromoethane, a,a,a',a'-tetrabromo-o-xylene, 1,1,2,2-tetrachloroethane, tetrachloroethane, tetrachloroethylene, a,a,a,a-tetrachlorololuene, tribromoethylene, 1,2,3tribromopropane, 1,1,1-trichloroethane, 1,1,2-trichloroethane, trichloroethylene, 1,2,3-trichloropropane, bis(p-chlorophenyl)methane, bromobenzene, 4-bromobiphenyl, 1-bromo-3-chlorobenzene, 4-bromo-1,2-dichlorobenzene, 1-bromo-4-fluorobenzene, 1-bromo-2-iodobenzene, 1-bromo-3-iodobenzene, 1-bromo-4-iodobenzene, 2-bromomesitylene, 1-bromonaphthalene, 2-bromonaphthalene, 3-bromo-1,2,4,5-tetramethylbenzene, o-bromotoluene, m-bromotoluene,p-bromotoluene, m-bromo-a,a,a-trifluoro-toluene, bromotriphenylethylene, 4-bromo-m-xylene, 2-bromo-p-xylene, chlorobenzene, p-chlorocumene, 1-chloro-2-fluorobenzene, 1-chloro-3-fluorobenzene, 1-chloro-2-iodobenzene, 1-chloro-3-iodobenzene, 1-chloro-4-iodobenzene, 1-chloronaphthalene, 2-chloronaphthalene, p-chlorostyrene, o-chlorotoluene, m-chlorotoluene, p-chlorotoluene, 2-chloro-p-xylene, 4-chloro-o-xylene, 9,10-dibromoanthracene, o-dibromobenzene, m-dibromobenzene, p-dibromobenzene, 4,4'-dibromobiphenyl, 1,4-dibromonaphthalene, 1,4-dibromo-2,3,5,6-tetramethylbenzene, 2,5-dibromotoluene, 2,5-dibromo-p-xylene, 9,10-dichloroanthracene, o-dichlorobenzene, m-dichlorobenzene,p-dichlorobenzene, p-dichlorobenzene, 1,2-dichloro-4-iodobenzene, dichloronaphthalene, o,a-dichlorotoluene, p,a-dichlorotoluene, 2-4 dichlorotoluene, 3,4-dichlorotoluene, 2,5-dichloro-p-xylene, m-difluorobenzene, o-diiodobenzene, m-diiodobenzene, p-diiodobenzene, diphenyliodonium bromide, fluorobenzene, 1-fluoronaphthalene, o-fluorotoluene, m-fluorotoluene, p-fluorotoluene, hexachlorobenzene, hexaiodobenzene, iodobenzene, 4-iodoblpheny, 1-iodonaphthalene, o-iodotoluene, m-iodotoluene, p-iodotoluene, 2-iodo-m-xylene, 4-iodo-m-xylene, 2-iodo-p-xylene, 2,2,2,2,4-pentachlorotoluene, 1,2,4,5-tetrabromobenzene, 1,2,4,5-tetrachlorobenzene, tetrachlorotetrahydronaphthalene, 2,2,2,6-tetrachlorotoluene, 2,2,2,2-tetrachlorotoluene, 1,2,4-tribromobenzene, 1,3,5-tribromobenzene, 1,2,4-trichlorobenzene, 1,3,5-trichlorobenzene, 1,1,1-trichloro-2,2-bis(p-chlorophenyl)ethane, 2,2,4-trichlorotoluene, a,3,4-trichlorotoluene.

DESCRIPTION OF THE PREPARED EMBODIMENT

The carbamate derivatives of this invention may be attained by reacting $n$ or $n/2$ moles of N-hydroxymethyl-2-pyrrolidinone with 1 mole of the aforementioned isocyanates or diisocyanates.

The N-hydroxymethyl-2-pyrrolidinone starting material may be obtained in relatively good yields by the reaction of 2-pyrrolidinone with paraformaldehyde in the presence of a small amount of an alkaline catalyst such as potassium hydroxide. The preparation of the precursor is discussed in detail in U.S. Pat. No. 3,073,843.

Broadly speaking, the instant invention includes the provisions of a compound having the formula:

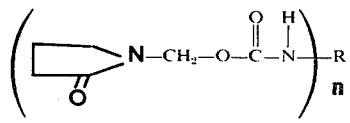

wherein R is a monovalent or divalent aliphatic, -alicyclic or acyl radical and wherein $n$ is 1 or 2.

The aforementioned derivatives have been found to provide unexpectedly increased flower inhibition properties in that they effectively retard the flowering of plants such as green plants and the like, and thereby serve as an effective herbicide in decreasing the foliage or retarding the growth thereof. The instant compounds are believed to be effective by virtue of the fact that they are absorbed by the plant and thereafter release a plant flowering inhibiting agent, in a form in which it is used by the plant.

The compounds of this invention are soluble in varying degrees in water and accordingly they can be applied to the plant in increased solutions composed wholly or partially of water; partial solutions include those formed of water and acetone or methylethyl ketone. Any aqueous medium may be provided that is not itself toxic to the plant. In the case of those particular derivatives which have relatively low water solubility, they may be solubilized by the use of co-solvents and the like. Also, the compounds may be absorbed on solid carriers such as vermiculite, attaclay, talc and the like for application in granular form. Dusts may also be used in which case the active ingredients will be diluted with clays or other powders, i.g., pyrophyllite, diatomaceous earth and attapulgite.

It has also been found that as an agricultural chemical, the compounds are useful as crop insecticides, as soil systemic and foliar fungicides, as pre- and post-emergent aquatic weed inhibitors, as nematocides and as insecticides for non-crop insects such as house flies.

The compounds of this invention can be applied to the plants or to grassy land in a concentration of from 1 to 20 lbs. per acre on higher, dependent on the particular derivative used. A preferred concentrate of application ranges from 2 to 10 lbs. per acre. The derivatives are generally only applied to key plants in a low volume of water to achieve satisfactory inhibition, and this is an important advantage of this invention. On the other hand, it is necessary to apply known agents in order to achieve the same effect in large volumes of water, of the order of 200 to 400 gallons per acre, even up to 1,000 gallons per acre to achieve initiation. It is accordingly possible to apply the compounds of this invention in far lower volumes of water to achieve a satisfactory flower inhibition. The ability to apply the instant compounds and reduce the high level of water ordinarily needed is a great agronomic advantage, because a large acreage of plantation can now be treated before recourse to water supply is necessary, smaller equipment can be used and costs can be reduced generally.

The foregoing derivatives of the N-hydroxymethyl-2-pyrrolidinone may be obtained by the reaction of an isocyanate or diisocyanate with the N-hydroxymethyl pyrrolidinone usually in the absence of a catalyst, however, in some instances an alkaline catalyst such as N-methyl or N-ethylmorpholine is helpful. The carbamate reactions are exothermic and even though a solvent is not necessary one may wish to employ an inert organic solvent such as acetone, dioxane, diethylcarbitol, chloroform, carbon tetrachloride, benzene, dimethyl formamide, n-methyl-2-pyrrolidinone and the like.

The reaction which is a condensation reaction, may be conveniently carried out in one of the aforementioned solvents, such as acetone, inasmuch as both reactants (N-hydroxymethyl-2-pyrrolidinone and the isocyanate) are normally quite soluble in ketone solvents. When acetone is used, the carbamate derivatives may precipitate out and thereafter be isolated by conventional filtration methods. If this is not the case, the carbamate derivatives may be isolated by conventional evaporation methods, i.e., by evaporating the acetone or by dilution with water or an organic solvent in which the carbamate is not soluble.

The reaction is generally conducted at low temperatures and preferably in an inert solvent which has had substantially all the water removed therefrom. Preferred temperatures of operation are about 45° to about 65°C and optionally as low as about 35° to as high as 100°C. A preferred solvent for use in the invention is acetone although other equivalent solvents may employed, such as those mentioned hereinabove.

In conducting the process, the isocyanate, diisocyanate or phenylisocyanate, a derivative or substituted form thereof, in solvent solution, is generally gradually charged to a solution containing the N-hydroxymethyl-2-pyrrolidinone also in a solvent. The gradual addition is conducted with stirring at the desired temperature, as aforesaid. After all the materials are added at the lower temperature, the reaction mixture which is exothermic soon begins to reflux. The mixture is refluxed for a short time: about 10 minutes to about 120 minutes, preferably 20 minutes, and then allowed to go to completion after which it is allowed to cool. Thereafter a precipitate forms which is filtered, washed and dried.

The following examples are presented to further illustrate the invention but are not considered to be limiting. All parts and proportions of the following examples as well as in the appended claims are by weight unless otherwise specified.

EXAMPLE 1

A solution of 12 g. of phenylisocyanate in 50 ml. acetone is added gradually to a solution of 11.5 g N-hydroxymethyl-2-pyrrolidinone in 50 ml. acetone with continual stirring at a temperature of 50°C. The reaction is exothermic and the acetone soon begins to reflux. The mixture is refluxed on the steam precipitated crystalline carbamate, is filtered, washed twice with 50 ml. of acetone and dried in an oven at 55°C. The product, N-phenyl-2-pyrrolidinoyl methyl carbamate

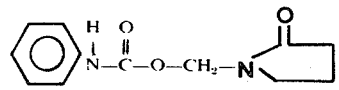

weights 17.1 g. and melts at 94°–96°C with the evolution of carbon dioxide.

EXAMPLE 2

A solution of 2-chlorophenylisocyanate and 50 ml. acetone is added over a period of 5 minutes to a warm (50°C) solution of 11.5 g. N-hydroxymethyl-2pyrrolidinone in 50 ml. acetone. After the addittion is complete, the mixture is refluxed for one hour. Evaporation of one-half of the acetone on a steam bath and cooling gives a white precipitate: N-2-chlorophenyl-2-pyrrolidinonyl-methyl carbamate,

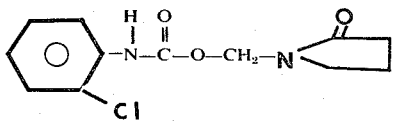

which melts at 200°–201°C with the evolution of gas. The remainder of the acetone is evaporated leaving an oil which may be a geometric isomer.

EXAMPLE 3

Fifteen grams of 3-chlorophenylisocyanate is gradually added to a solution of 11.5 g. N-hydroxymethyl-2-pyrrolidinone in 100 ml. of acetone. After the addition is complete 10 minutes), the mixture is refluxed for 1 hour. The hot solution is filtered and after cooling in an incewater bath, a white crystalline product separates. After filtering and drying in an oven at 55°–60°C, the product, N-3-chlorophenyl-2-pyrrolidinonylmethyl carbamate,

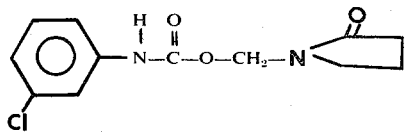

weighs 14.3 g. and melts at 142°–143°C with the evolution of carbondioxide.

EXAMPLE 4

To a solution of 11.5 g. of N-hydroxymethyl-2-pyrrolidinone in 100 ml. of acetone warmed to 50°C, there is added over a period of five minutes, 15.5 g. 4-chlorophenylisocyanate. During the addition a white crystalline precipitate separates out, the latter is refluxed for ten minutes on a steam bath and then cooled to room temperature by an icewater bath. The crystalline product, N-4-chlorophenyl-2-pyrrolidinonyl-methyl carbamate,

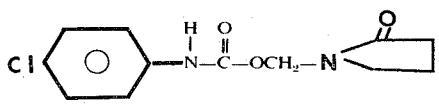

weights 15.6 g., and melts at 146°–147°C with the evolution of carbon dioxide.

EXAMPLE 5

A solution of 8 g. 2-nitrophenylisocyanate in 30 ml. acetone is gradually added (5 minutes) to a warm (50°C) solution of 5.75 g. N-hydroxymethyl-2-pyrrolidinone in 50 ml. of acetone. After the exothermic reaction subsides, the mixture is refluxed for one hour, and then filtered. After cooling, the product, N-2-nitrophenyl-2- pyrrolidinonyl-methyl carbamate,

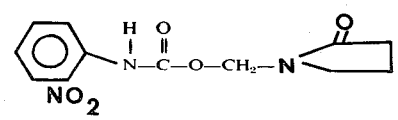

is precipitated by dilution with water. The precipitated product after filtering and drying in an oven at 60°C, melts at 107°–108°C and evolves carbon dioxide at 112°C.

EXAMPLE 6

Eight grams of 3-nitrophenylisocyanate is dissolved in 50 ml. acetone by warming on a steam bath. A solution of 5.75 g. N-hydroxy-methyl-2-pyrrolidinone in 50 ml. of acetone is made by warming on a steam bath and filtering from a small trace of insoluble material through fluted filter. The isocyanate solution is added gradually to the N-hydroxymethyl-2-pyrrolidinone solution over a period of 5 minutes. The mixture is then refluxed for one hour on an oil bath, during which time some small crystals separate. Cooling in an icewater bath causes further separation of crystals. These are filtered and dried in an oven at 60°C. The product, N-3-nitrophenyl-2-pyrrolidinonyl-methyl carbamate

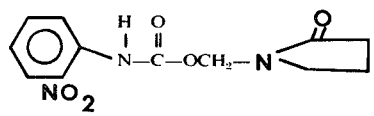

melts at 144°–145°C with the evolution of carbon dioxide and weighs 9.9 g.

EXAMPLE 7

A solution of 5.75 g. N-hydroxymethyl-2-pyrrolidinone in 50 ml. of acetone is made by gently warming on a steam bath. To this there is gradually added a solution of 8 g. 4-nitrophenylisocyanate in 30 ml. of acetone over a period of 5 minutes. The mixture is refluxed on an oil bath for 1 hour, during which time some crystals separate. The mixture is cooled in an icewater bath and the crystals filtered and dried in an oven at 60°C. The product, N-4-nitrophenyl-2-pyrrolidinonyl-methyl carbamate,

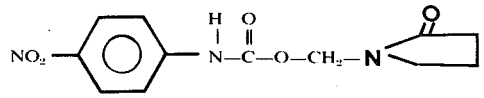

weighs 11.5 g. and melts at 144°–145°C with the evolution of carbon dioxide. A mixed melting point with the meta isomer described in Example 3 gives a 5° depression of melting point.

EXAMPLE 8

A solution of 18.5 g. 3,4-dichlorophenylisocyanate and 30 ml. of acetone is added gradually over a period of 5 minutes to a solution of 11.5 g. N-hydroxymethyl- 2-pyrrolidinone in 100 ml. of acetone. After the exothermic reaction has subsided, the mixture is refluxed for 1 hour. The hot solution is filtered and cooled in an icewater bath to precipitate the carbamate derivative. After filtering and drying in an oven at 60°C the product, N-3,4-dichlorophenyl-2-pyrrolidinonylmethl carbamate,

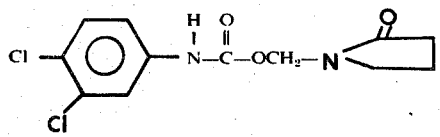

weighs 18 g. and melts at 134° 14 135°C with the evolution of carbon dioxide gas.

EXAMPLE 9

A solution of 16.5 g. 1-naphthylisocyanate is added gradually over a period of 10 minutes to a solution of 11.5 g. N-hydroxymethyl-2-pyrrolidinone and 60 ml. of acetone. The mixture is refluxed for 5–10 minutes on an oil bath. One-half of the acetone is distilled and after standing overnight, the product is separated by filtration and dried in a vacuum oven at 60°C. The product, N-1-naphthyl-2-pyrrolidinonyl-methyl carbamate,

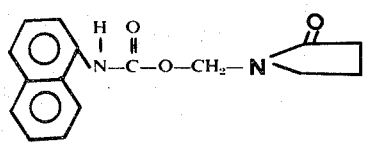

weighs 23.5 g. and melts at 183° – 185°C with the evolution of carbon dioxide gas.

EXAMPLE 10

To a solution of 11.5 g. N-hydroxymethyl-2-pyrrolidinone and 80 ml. acetone there is gradually added over a period of 5 minutes a solution of 13.3 g. 3-methylphenylisocyanate and 20 ml. of acetone. After the addition is complete the mixture is refluxed for one hour, then cooled and filtered through large fluted filter paper. The filtrate is diluted with 100 ml. of water to precipitate the carbamate derivative. This is filtered and dried in a vacuum oven at 60°C overnight. The product, N-3-tolyl-2-pyrrolidinonyl-methyl carbamate,

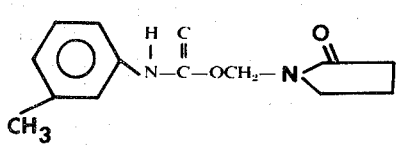

weighs 11.5 g. and melts at 137° – 138°C with evolution of carbon dioxide.

EXAMPLE 11

To a solution of 11.5 g. N-hydroxymethyl-2-pyrrolidinone in 100 ml. of acetone there is added over a period of ten minutes, 8.7 g. of 2,4-tolylenediisocyanate. The mixture is refluxed in an oil bath for one hour. The reaction mixture is filtered and the acetone evaporated on a steam bath, the white solid residue remaining is dried in an oven at 60°C. The N-2,4-m-tolylene-bis (2-pyrrolidinonyl-methyl carbamate),

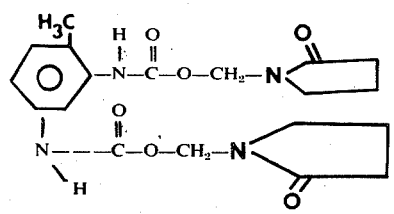

weighs 11 g. and after purification by treatment with boiling ethanol, filtering and drying, melts at 160° – 162°C with evolution of carbon dioxide.

EXAMPLE 12

The procedure of Example 11 is repeated except that 8.7 g. of an 80% 2,4 and 20% 2,6-tolylenediisocyanate isomer mixture is used. Evaporation of the acetone produces a viscous oil comprising a carbamate isomer mixture. This material gasses at 60°C. An isomeric mixture of N-2,4-m-toluene-bis (2-pyrrodidinoyl-methyl carbamate), and N-2,6-m-toluene bis (2-pyrrolidinoyl-methyl carbamate),

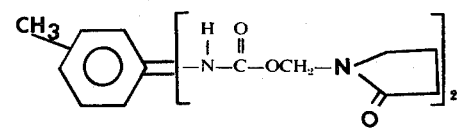

(80% 2,4-isomer, 20% 2,6-isomer) is dried thoroughly in a vacuum oven at 60°C.

EXAMPLE 13

A solution of 8 g. allyisocyanate and 50 ml. acetone is added gradually to a solution of 11.5 g. N-hydroxymethyl-2-pyrrolidinone in 50 ml. of acetone. The mixture is refluxed for one and one-half hours on a steam bath. After evaporation of the acetone an oily residue of N-2-propenyl-2-pyrrolidinonylmethyl carbamate,

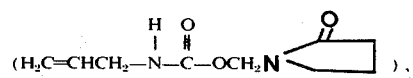

having a repulsive odor remain.

EXAMPLE 14

A solution of 3,5 g. N-hydroxymethyl-2-pyrrolidinone in 50 ml. of acetone is heated to 50°c and 5 g. trichloroacetylisocyanate is added dropwise over a ten minute period. The mixture is refluxed for 1 hour and the hot solution filtered through fluted filter paper. The acetone is evaporated and the product, an oily residue of N-trichloroacetyl pyrrolidinonyl-methyl carbamate,

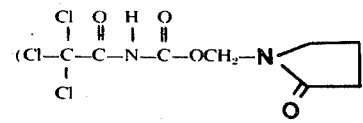

is dried thoroughly in a vacuum oven at 60°C.

EXAMPLE 15

To a solution of 11.5 g. N-hydroxymethyl-2-pyrrolidinone in 80 ml. of acetone there is added gradually over 5 minutes a solution of 7.1 g. ethylisocyanate and 20 ml. of acetone. The mixture is refluxed for one hour and filtered while hot. The acetone is evaporated on a steam bath and dried in an oven at 60°C. The product is a colorless oil, N-ethyl-2-pyrrolidinonyl-methyl carbamate

weighs 16.5 g. A sample is placed in a capillary tube and heated to 145°C whereupon it decomposes and gives off carbon dioxide.

EXAMPLE 16

11.5 g. (0.1 mole) of N-hydroxymethyl-2-pyrrolidinone is dissolved in 80 ml. of acetone by warming (50°C) on a steam bath. There is gradually added 7.5 g. hexamethylene diisocyanate; 20 ml. of acetone is used as diluent for the diisocyanate. The mixture is refluxed for 1 hour on a steam bath, during which time a white crystalline solid separates out. After cooling in an ice bath, the bisurethane is filtered on a Buchner funnel, washed with acetone and dried in an oven at 55°C. The product N-1,6-hexamethylene-bis-2-pyrrolidinonyl-methyl carbamate,

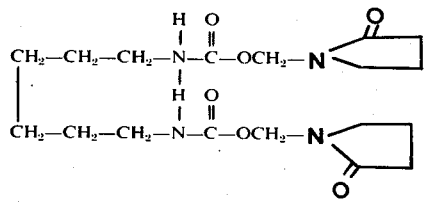

We claim:
1. A compound having the formula

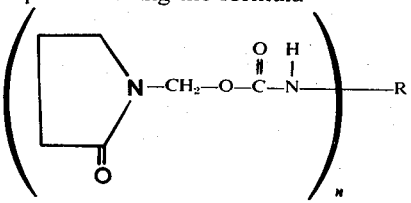

where $n$ is 1 or 2 and R is selected from the group consisting of substituted and unsubstituted phenyl, said substituted phenyl being substituted by nitro or one or two chloro atoms; substituted and unsubstituted $C_1$-$C_6$ alkyl, said substituted alkyl being mono-substituted by chloro; and naphthyl.

2. A compound as defined in claim 1 wherein R is phenyl or naphthyl.

3. The compound as defined in claim 1 which is N-phenyl-2-pyrrolidinonyl-methyl carbamate.

4. The compound as defined in claim 1 which is n-2-chlorophenyl-2-pyrrolidinonyl-methyl carbamate.

5. The compound as defined in claim 1 which is N-3-chlorophenyl-2-pyrrolidinonyl-methyl carbamate.

6. The compound as defined in claim 1 which is N-4-chlorophenyl-2-pyrrolidinonyl-methyl carbamate.

7. The compound as defined n claim 1 which is N-3,4-dichlorophenyl-2-pyrrolidinonyl-methyl carbamate, 8. The compound as defined in claim 1 which is N-2-nitrophenyl-2-pyrrolidinonyl-methyl carbamate.

9. The compound as defined in claim 1 which is N-4-nitrophenyl-2-pyrrolidinonyl-methyl carbamate.

10. The compound as defined in claim 1 which is N-1-naphthyl-2-pyrrolidinonyl-methyl carbamate.

11. The compound as defined in claim 1 where R is an alkyl having from 1 to 6 carbons.

12. The compound as defined in claim 1 which is designated N-trichloroacetyl-2-pyrrolidinonyl-methyl carbamate.

13. The compound as defined in claim 11 designated N-ethyl-2-pyrrolidinonyl-methyl carbamate.

* * * * *